United States Patent [19]

Walker et al.

[11] Patent Number: 4,579,669

[45] Date of Patent: * Apr. 1, 1986

[54] HIGH TEMPERATURE DRILLING FLUIDS BASED ON SULFONATED THERMOPLASTIC POLYMERS

[75] Inventors: Thad O. Walker, Humble, Tex.; Dennis G. Peiffer, East Brunswick; Robert D. Lundberg, Bridgewater, both of N.J.

[73] Assignee: Exxon Research and Engineering Co., Florham Park, N.J.

[*] Notice: The portion of the term of this patent subsequent to Jan. 10, 2001 has been disclaimed.

[21] Appl. No.: 600,976

[22] Filed: Apr. 16, 1984

Related U.S. Application Data

[63] Continuation-in-part of Ser. No. 292,333, Aug. 12, 1981, abandoned.

[51] Int. Cl.⁴ .............................................. C09K 7/06
[52] U.S. Cl. ............................... 252/8.5 M; 252/8.5 P
[58] Field of Search ......................... 252/8.5 M, 8.5 P

[56] References Cited

U.S. PATENT DOCUMENTS

| | | | |
|---|---|---|---|
| 2,099,825 | 11/1937 | Rolshausen et al. | 252/8.5 M |
| 2,552,775 | 3/1951 | Fischer et al. | 252/8.5 C |
| 2,650,905 | 9/1953 | Fordyce et al. | 252/8.5 C |
| 2,702,787 | 2/1955 | Freeland | 252/8.5 P |
| 2,743,233 | 4/1956 | Fisher | 252/8.5 M |
| 2,801,967 | 8/1957 | Wilson | 252/8.5 C |
| 3,252,903 | 5/1966 | Crittendon | 252/8.5 P |
| 3,396,136 | 8/1968 | Dickerson | 252/33 X |
| 3,931,021 | 6/1976 | Lundberg | 252/32 X |
| 4,425,455 | 1/1984 | Turner et al. | 252/8.5 X |
| 4,425,461 | 1/1984 | Turner et al. | 252/8.5 X |
| 4,425,462 | 1/1984 | Turner et al. | 252/8.5 M |
| 4,447,338 | 5/1984 | Lundberg et al. | 252/8.5 M |

Primary Examiner—Herbert B. Guynn
Attorney, Agent, or Firm—Richard E. Nanfeldt

[57] ABSTRACT

A new class of viscosification agents based on water insoluble and oil insoluble neutralized sulfonated thermoplastic resins is described for oil-based drilling muds. The resultant muds display good viscosity characteristics and good stability when formulated from water insoluble and oil insoluble neutralized sulfonated thermoplastic polymers having an appropriate sulfonate level and cation type.

13 Claims, No Drawings

HIGH TEMPERATURE DRILLING FLUIDS BASED ON SULFONATED THERMOPLASTIC POLYMERS

CROSS-REFERENCE TO RELATED APPLICATIONS

This is a continuation-in-part application of U.S. Ser. No. 292,333, filed Aug. 12, 1981, now abandoned.

FIELD OF THE INVENTION

The present invention relates to water insoluble and diesel oil insoluble sulfonated thermoplastic polymers which function as viscosification agents when added to oil-based drilling muds which are the fluids used to maintain pressure, cool drill bits, and lift cuttings from the holes in the drilling operation for oil and gas wells. The water insoluble and diesel oil insoluble sulfonated thermoplastic polymers have about 5 to about 100 milliequivalents of sulfonate groups per 100 grams of the sulfonated thermoplastic polymer (0.005 to 0.1 sulfonate units per styrene unit), wherein the sulfonated groups are neutralized with a metallic cation or an amine or ammonium counterion. A polar cosolvent can optionally be added to the mixture of oil drilling mud and sulfonated polymer, at concentrations of up to 1.0 wt.%, wherein the polar cosolvent facilitates the incorporation of the sulfonated polymer in the oil drilling mud at the interface of the diesel oil phase and water phase by decreasing the strong ionic interactions between the sulfonate groups and the sulfonated polymer.

BACKGROUND OF THE INVENTION

In the field of drilling in the exploration for oil and gas, an important component is that of the formulation of drilling muds. Drilling muds are the fluids which are used to maintain pressure, cool drill bits, and lift cuttings from the holes and vary in composition over a wide spectrum. Generally, drilling muds are based on aqueous formulations or oil based formulations.

A conventional oil-based drilling mud formulation is comprised of basically the following ingredients: oil (generally No. 2 diesel fuel), emulsifying agents (alkaline soaps and fatty acids), wetting agents (dodecylbenzene sulfonate), water, barite or barium sulfate, (weighting agent), asbestos (employed as viscosification agent) and/or, amine treated clays (also as viscosification agent).

The above combination of ingredients is generally formulated to possess various weights based primarily on amount of barite added. For example, a typical drilling mud can vary in specific gravity from a range of about 7 lbs. per gallon up to 17 lbs. per gallon or even greater. This variation in specific gravity is primarily controlled by the amount of barite added. The above formulations perform adequately in a number of applications, primarily those where the use of oil-based drilling muds is dictated by the lack of stability of the formation in which drilling is taking place. For example, in various types of shale formation, the use of conventional water-based muds can result in a deterioration and collapse of the shale formation. The use of the oil-based formulations circumvents this problem. However, it is observed that the current oil-based drilling muds have some significant disadvantages. One disadvantage is that the incorporation of asbestos or asbestos fines can incur significant health problems, both during the mud formulation and potentially during the subsequent use of such formulations. Therefore, it is desirable to eliminate the use of asbestos completely in such drilling muds. On the other hand, the use of substitutes for asbestos in this application has heretofore not been particularly successful in that the resulting viscosification agents must maintain adequate viscosities under the drilling conditions which can involve high temperature and high shear conditions.

There has been a substantial need for a drilling fluid which would exhibit good performance at high temperature in water sensitive formation. Past experience has shown that oil-based drilling fluids can provide good performance in water sensitive formations, and the state of the art systems can perform well up to about 350° F. Typically in such formations the failure of the viscosities in current muds is circumvented by the addition of more viscosifier during the circulation of the drilling mud. While this solution is adequate at moderate temperatures, when much higher temperatures are encountered (example: geothermal wells or natural gas wells), the degradation of the viscosifier can be so rapid that the additional costs for a viscosifier can be uneconomical. There is a need, therefore, for drilling fluids which can maintain their viscosity and gel strength to temperatures up to and exceeding 400° F. These needs are not adequately met by the current drilling fluids, even with the oil-based drilling muds often employed.

This invention describes an approach to viscosification of oil-based drilling muds which permits the substitution of sulfonated ionomers for asbestos fines and amine clays. The resulting polymer-modified drilling muds display viscosities which are in a desirable range for drilling mud applications, good viscosities at retention after aging and gel strength up to temperatures of 400° F. and higher, based on tests conducted for 16 hours at such temperatures.

The types of sulfonated polymers that are envisioned in the present invention include sulfonated polystyrene and sulfonated poly t-butyl styrene. These polymers are insoluble in both the diesel oil phase and aqueous phase of the drilling mud.

It has also been shown that sulfonated EPDM is very effective as a viscosifier for oil-based drilling muds, as described in copending application Ser. No. 292,235, filed Aug. 12, 1981, now U.S. Pat. No. 4,447,338. We have found that sulfonated EPDM provides good viscosification at temperatures exceeding 300° F. when formulated in a mud based on fresh water. Higher Temperatures (350° F., 400° F.) encountered in accelerated aging studies for 16 hours have shown that sulfonated EPDM loses its efficacy almost completely at those higher temperatures. It appears that until now, there has been no viscosifier which is effective at temperatures at 400° F. for the typical aging period of 16 hours. The instant invention will describe materials that provide excellent gel strength at these higher temperatures and may be effective at even higher temperatures.

The preferred species of the instant invention is lightly sulfonated polystyrene with a sulfonate level at about 5 to about 100 milliequivalents of sulfonate groups per 100 grams of sulfonated polymer (0.005 to 0.1 sulfonate units per styrene unit). This polymer is not soluble in either the hydrocarbon diesel oil phase or the aqueous phase of a formulated mud and, the polymer is located at the interface of the aqueous phase and the hydrocarbon diesel oil phase. As a consequence, this polymer is an extremely effective viscosifier even at quite low levels.

A second facet of the instant invention relates to the use of these materials in formulations which employ high concentrations of salt in the aqueous phase. The sulfonated polystyrenes (S-PS) which are the preferred embodiment of this invention lose some of thier efficacy in salt water. It has been found that the combination of a suitable non-ionic emulsifier with S-PS gives formulations which are effective with salt water. Therefore, these systems give formulations which perform well at high temperatures and in the presence of salt water phases which is a highly desired objective in the drilling fluids industry.

SUMMARY OF THE INVENTION

The present invention relates to water insoluble and diesel oil insoluble sulfonated thermoplastic polymers which function as viscosification agents when added to oil-based drilling muds which are the fluids used to maintained pressure, cool drill bits, and lift cutting from the holes in the drilling operation for oil and gas wells. The sulfonated thermoplastic polymers have about 5 to about 100 milliequivalents of sulfonate groups per 100 grams of the sulfonated thermoplastic polymer (0.005 to 0.1 sulfonate units per styrene unit), wherein the sulfonated groups are neutralized with a metallic cation or an amine or ammonium counterion. A polar cosolvent can optionally be added to the mixture of oil drilling mud and sulfonated polymer, wherein the polar cosolvent facilitates the incorporation of the sulfonated polymer in the oil drilling mud at the diesel oil phase and water phase by decreasing the strong ionic interactions between the sulfonate groups of the sulfonated polymer. During use of the oil drilling mud, the polar cosolvent is boiled off of the drilling mud due to the high temperatures generated. The polar cosolvent is incorporated into the drilling mud formulation at concentrations of up to 1 wt.%. The use of a polar cosolvent does not make the sulfonated polystyrene soluble in the diesel oil phase because the polystyrene backbone is insoluble in a diesel oil. In order for a sulfonated polymer to be soluble in a solvent system of a hydrocarbon solvent and a polar cosolvent, the polymeric backbone must be soluble in the hydrocarbon solvent. Polystyrene is insoluble in diesel oil.

GENERAL DESCRIPTION

The present invention describes a new class of viscosification agents for oil-based drilling muds which are used during operation of gas and oil wells, wherein these viscosification agents are water insoluble and diesel oil insoluble sulfonated thermoplastic polymers. The oil-base drilling muds of the instant invention minimally comprise, but can also include other additives, an organic liquid such as an oil, fresh water or salt water, an emulsifier, a wetting agent, a weighting material and a sulfonated polymer. In general, the oil-based drilling mud has a specific gravity of about 7 lb/gallon to about 20 lb/gallon, more preferably, about 10 to about 16, and most preferably about 12 to about 16. A typical oil-based drilling mud as envisioned by the instant invention comprises: an oil; about 1 to about 10 parts by weight of water per 100 parts by weight of the oil, more preferably about 3 to about 5; about 0.25 to about 4.0 lbs/bbl of a water insoluble and oil insoluble neutralized sulfonated thermoplastic polymer; and 20 to about 50 lb/bbl of an emulsifier and/or supplementary emulsifier; about ½ to about 5 lb/bbl of a wetting agent; and weighting material (Barium sulfate or Barite) necessary to give the desired mud density; which comprises less than about 800 lb/bbl of Barium sulfate, more preferably about 5 to about 750, and most preferably about 10 to about 700; and about 0.25 to about 4 lb/bbl of sulfonated polymer.

The oil employed in the oil-based drilling mud is generally a No. 2 diesel fuel, but it can be other commercial available hydrocarbon solvent such as kerosene, fuel oils or selected crude. If crudes are used, they should be weathered and must be free of emulsion breakers.

Typical, but non-limiting examples of suitable emulsifiers which can be readily employed are magnesium or calcium soaps of fatty acids, wherein a combination of emulsifiers can be employed.

Typical, but non-limiting examples of a suitable wetting agent which can be readily employed is an alkyl-aryl sulfonate.

Typical, but non-limiting examples of a weighting material which can be readily employed is barite or a barium sulfate which may optionally be surface treated with other cations, such as calcium.

The water insoluble and diesel oil insoluble neutralized sulfonated thermoplastic polymers employed in the oil base drilling muds are derived from polystyrene type thermoplastic polymers which are selected from the group consisting essentially of polystyrene, poly-t-butyl-styrene, polychlorostyrene, polyalpha methyl styrene or co- or terpolymers of the aforementioned with acrylonitrile or vinyl toluene, polystyrene, poly-t-butyl-styrene, polychlorostyrene, polyvinyl toluene, polyalpha methyl styrene or co- or terpolymers of the aforementioned with acrylonitrile methyl methacrylate butadiene.

While water insoluble and diesel oil insoluble sulfonated thermoplastics are the preferred form of this invention, there are a large number of water insoluble and diesel oil insoluble sulfonate-containing polymers which fall within the scope of this invention. These are described in U.S. Pat. Nos. 3,870,841 and 3,931,021, which are hereby incorporated by reference. Such polymers can be prepared by direct sulfonation of the preformed polymer or by copolymerization with a sulfonate-containing monomer. Particularly desirable polymers are those derived from vinyl monomer or comonomer, except propylene.

The polystyrene thermoplastics suitable for use in the practice of the invention have a glass transition temperature from about 70° C. to about 150° C., more preferably about 90° C. to about 140° C. and most preferably about 90° C. to about 120° C. These polystyrene resins have a weight average molecular weight, as measured by GPC, of about 5,000 to about 500,000, more preferably about 20,000 to about 350,000, and most preferably about 90,000 to about 300,000. These base polystyrene thermoplastic resins can be prepared directly by any of the known polymerization processes. The term "thermoplastic" is used in its conventional sense to mean a substantially rigid (flexus modulus >10,000 psi) material capable of retaining the ability to flow at elevated temperatures for relatively long times. These polystyrene resins are insoluble in diesel oils.

The preferred polystyrene thermoplastic resin is a homopolymer of styrene having a number average molecular weight of about 180,000, and an intrinsic viscosity in toluene of about 0.8. These polymers are widely available commercially in large volume. A suitable material is Styron 666 manufactured by Dow Chemical Co., which affords a suitable number average molecular weight of about 105,000.

The thermoplastic polymers are sulfonated by a process in a non-reactive solvent such as a chlorinated aliphatic solvent, chlorinated aromatic hydrocarbon, or an aliphatic hydrocarbon such as carbon tetrachloride, dichloroethane or chlorobenzene. The preferred solvents are the lower boiling chlorinated hydrocarbons. A sulfonating agent is added to the solution of the polymer and a non-reactive solvent at a temperature of about $-100°$ C. to about $100°$ C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, incorporated herein by reference. These sulfonating agents are selected from an acyl sulfate, a mixture of sulfuric acid and an acid anhydride or a complex of sulfur trioxide donor and a Lewis base containing oxygen, sulfur, or phosphorus. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiopene or triethyl phosphate. The most preferred sulfonation agent for this invention is an acyl sulfate selected from the group consisting of benzoyl, acetyl, propionyl or butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol or isopropanol, with an aromatic hydroxyl compound, such as phenol, a cycloaliphatic alcohol such as cyclohexanol or with water. The unneutralized sulfonated thermoplastic polymer has about 5 to about 100 meq. sulfonate groups per 100 grams of sulfonated polymer (0.005 to 0.1 sulfonate groups per styrene unit), more preferably about 8 to about 60; and most preferably 10 to about 45. The range of sulfonate content which can be considered does vary over an extremely broad latitude; however, it has been observed that in those systems of high sulfonation level that there is great difficulty in maintaining the water insoluble and oil insoluble sulfonated polymers at the interface of the aqueous phase and the hydrocarbon diesel oil phase and there can be very adverse effects in terms of the interaction of the sulfonated polymer with the barite weighting agent and with the other components of the drilling mud. Therefore, there is clearly an optimum level of sulfonation content which may vary from one sulfonated backbone to another but for sulfonated polystyrene it is in the most preferred embodiment of the invention as described above. The meq. of sulfonate groups/100 grams of sulfonated thermoplastic polymer is determined by both titration of the polymeric sulfonate acid and Dietert Sulfur analysis. In the titration of the unneutralized sulfonate, the polymer is dissolved in solvent consisting of 95 parts by volume of toluene and 5 parts by volume of methanol at a concentration level of 50 grams per liter of solvent. The unneutralized sulfonate is titrated with ethanolic sodium hydroxide to an Alizarin-Thymolphthalein end-point.

The unneutralized sulfonated thermoplastic polymer is gel free and hydrolytically stable. Gel is measured by stirring a given weight of polymer in a solvent comprised of 95 toluene-5-methanol at a concentration of 5 wt.%, for 24 hours, allowing the mixture to settle, withdrawing a weighed sample of the supernatant solution and evaporating to dryness.

Hydrolytically stable means that the unneutralized sulfonate will not be eliminated under neutral or slightly basic conditions to a neutral moiety which is incapable of being converted to highly ionic functionality.

Neutralization of the unneutralized sulfonate groups of the sulfonated thermoplastic polymer is done by the addition of a solution of a basic salt to the unneutralized sulfonated thermoplastic polymer dissolved in the mixture of the aliphatic and non-reactive aromatic solvent. The basic salt is dissolved in a binary solvent system consisting of water and/or an aliphatic alcohol. The counterion of the basic salt is selected from the group consisting of antimony, iron, aluminum, lead and Groups IA, IIA, IB and IIB of the Periodic Table of Elements and mixtures thereof as well as ammonium and amine counterions. The preferred cations include zinc, magnesium, sodium, lead, barium, calcium, and ammonium cations, wherein zinc, magnesium and sodium are the most preferred cations. The anion of the basic salt is selected from a carboxylic acid having from about 1 to about 4 carbon atoms, a hydroxide, or alkoxide and mixtures thereof. The preferred neutralizing agent is a metal acetate, more preferably sodium acetate. Sufficient metal salt of the carboxylic acid is added to the solution of the unneutralized sulfonated thermoplastic polymer to effect neutralization. It is preferable to neutralize at least 95% of the sulfonate groups, more preferably about 98%, most preferably 100%.

Examples of metal oxides useful in preparing metal sulfonates are MgO, CaO, BaO, ZnO, $Ag_2O$, $PbO_2$ and $Pb_3O_4$. Useful examples of metal hydroxides are NaOH, KOH, LiOH, $Mg(OH)_2$ and $Ba(OH)_2$.

In addition to the sulfonation/neutralization of polystyrene, an alternate approach to such polymers involves the copolymerization of sulfonate-containing monomers with styrene to yield polymers having the appropriate levels of sulfonate groups. The copolymerization chemistry to obtain such material is similar to pending copolymerization applications U.S. Ser. Nos. 117,196; 117,197; and 117,198, all filed on Jan. 31, 1980 and now abandoned, and which are hereby incorporated by reference. The sulfonate-containing polymers obtained via this approach are also effective in this invention.

Alternatively, a latex of a sulfonated polymer as described in U.S. Pat. Nos. 3,912,683 and 4,007,149, which are herein incorporated by reference, could be readily employed as a convenient method of introducing the sulfonated polymer into the oil-based drilling mud.

DETAILED DESCRIPTION OF THE PREFERRED EMBODIMENT

EXAMPLE I

Oil-based drilling muds were prepared using conventional laboratory methods. The muds contain No. 2 diesel oil, fresh or salt water, emulsifier,, supplementary emulsifier, a wetting agent, weighting agent and a 1.7 mole percent sodium salt of sulfonated polystyrene which is insoluble in both No. 2 diesel oil and water. The muds were aged overnight at 150° F. to insure chemical equilibrium. Aliquots of the mud were aged in pressurized cells at 300° F. and 400° F. for 16 hours. The cells were cooled at room temperature, depressurized, and then the rheological properties of the mud were measured on a Fann Model 35 viscometer at 115° F. Muds containing 0.5 and 1.0 lbs/bbl of sulfonated polystyrene are presented in Table I.

EXAMPLE II

Oil-based drilling muds, formulated with the additives employed in Example I (except the 1.7 mole percent sulfonated polystyrene) and containing 2.65 and 4.19 mole percent sodium salt of sulfonated polystyrene, were prepared using conventional laboratory methods.

TABLE I

Rheological Properties of Several Oil-Based Muds Containing 1.7 Mole Percent Sulfonated Polystyrene

| Designation | lbs/bbl[A] | Water | 600[B] | 300[C] | PV[D] | YP[E] | Gels[F] | Temp. °F. |
|---|---|---|---|---|---|---|---|---|
| 1M | 0.5 | Fresh | 63 | 35 | 28 | 7 | 2–10 | 150 |
|    |     |       | 58 | 32 | 26 | 6 | 1–11 | 300 |
|    |     |       | 69 | 40 | 29 | 11 | 5–27 | 400 |
| 2M | 1.0 | Fresh | 62 | 36 | 26 | 10 | 3–12 | 150 |
|    |     |       | 62 | 35 | 27 | 8 | 2–18 | 300 |
|    |     |       | 88 | 54 | 34 | 20 | 10–26 | 400 |
| 3M | 0.5 | Salt  | 41 | 23 | 18 | 5 | 2–3 | 150 |
|    |     |       | 41 | 22 | 19 | 3 | 1–2 | 300 |
|    |     |       | 44 | 23 | 21 | 2 | 1–4 | 400 |
| 4M | 1.0 | Salt  | 44 | 24 | 20 | 4 | 1–3 | 150 |
|    |     |       | 49 | 27 | 22 | 5 | 2–4 | 300 |
|    |     |       | 55 | 30 | 25 | 5 | 1–3 | 400 |

[A]Polymer concentration in lbs/bbl.
[B]Reading taken on a Fann ® rotational viscometer at 600 rpm.
[C]Reading taken on a Fann ® rotational viscometer at 300 rpm.
[D]Plastic viscosity in centipoise units: Difference between the 600 rpm and 300 rpm measurements.
[E]Yield point in units of lbs/100 ft.$^2$: Difference between the 300 rpm measurement and plastic viscosity.
[F]First number is the initial value (expressed as lbs/100 ft.$^2$) on the viscometer at 3 rpm, while the second number corresponds to the value after 10 minutes has elapsed.

Table I shows the effectiveness of 1.7 mole percent sodium salt of sulfonated polystyrene as a viscosifier and gel strength additive for oil-based muds. The data Both of these sulfonated polystyrenes were insoluble in both water and No. 2 diesel oil. These results are shown in Table II.

TABLE II

Rheological Properties of Several Oil-Based Drilling Muds Containing 2.65 or 4.19 Mole Percent Sulfonated Polystyrene

| Designation | Sulfonation Level (mole %) | bbl | H$_2$O | 600[A] | 300[A] | PV[A] | YP[A] | Gels[A] | Temp. °F. |
|---|---|---|---|---|---|---|---|---|---|
| 1 | 2.65 | 0.5 | Fresh | 61 | 37 | 24 | 13 | 5–13 | 150 |
|   |      |     |       | 47 | 25 | 22 | 3 | 2–13 | 300 |
|   |      |     |       | 58 | 38 | 20 | 8 | 3–17 | 400 |
| 2 | 2.65 | 1.0 | Fresh | 59 | 34 | 25 | 9 | 3–10 | 150 |
|   |      |     |       | 50 | 28 | 22 | 6 | 3–17 | 300 |
|   |      |     |       | 60 | 34 | 26 | 8 | 6–21 | 400 |
| 3 | 4.19 | 0.5 | Fresh | 54 | 32 | 22 | 10 | 4–10 | 150 |
|   |      |     |       | 44 | 22 | 22 | 0 | 1–1 | 300 |
|   |      |     |       | 50 | 25 | 25 | 0 | 1–9 | 400 |
| 4 | 4.19 | 1.0 | Fresh | 57 | 33 | 24 | 9 | 4–11 | 150 |
|   |      |     |       | 47 | 24 | 23 | 1 | 1–6 | 300 |
|   |      |     |       | 57 | 30 | 27 | 3 | 2–14 | 400 |
| 5 | 2.65 | 0.5 | Salt  | 43 | 25 | 18 | 7 | 3–6 | 150 |
|   |      |     |       | 46 | 24 | 22 | 2 | 1–4 | 300 |
|   |      |     |       | 53 | 28 | 25 | 3 | 2–8 | 400 |
| 6 | 2.65 | 1.0 | Salt  | 37 | 20 | 17 | 3 | 1–3 | 150 |
|   |      |     |       | 42 | 21 | 21 | 0 | 1–2 | 300 |
|   |      |     |       | 53 | 26 | 27 | 0 | 1–5 | 400 |
| 7 | 4.19 | 0.5 | Salt  | 37 | 20 | 17 | 3 | 2–4 | 150 |
|   |      |     |       | 40 | 20 | 20 | 0 | 1–2 | 300 |
|   |      |     |       | 46 | 24 | 22 | 2 | 1–8 | 400 |
| 8 | 4.19 | 1.0 | Salt  | 39 | 21 | 18 | 3 | 1–3 | 150 |
|   |      |     |       | 40 | 20 | 20 | 0 | 1–2 | 300 |
|   |      |     |       | 42 | 21 | 21 | 0 | 1–2 | 400 |

[A]The meaning of the symbol is given in Table I.

show that mud containing fresh water can be treated with the sulfonated polymer to enhance both the viscosity and gel strength characteristics. These desirable properties are maintained after subjecting the mud at high temperatures (300° F.–400° F.). In addition, the data show that the sulfonated polystyrene is not effective as a viscosifier and gel strength additive for oil muds containing calcium chloride water.

Table II shows the effectiveness of two different sulfonate levels of polystyrene as a viscosifier for oil-based muds containing either fresh or calcium chloride water. The data indicates that the 2.65 mole percent sulfonate level functions well as a viscosifier and gel strength additive for muds containing fresh water. Also, the data indicates that the 4.19 mole percent sulfonated polystyrene does not perform as well as the 2.65 mole percent sulfonated polystyrene material in fresh water. The reduced performance of the former material is due essentially to the inability of maintaining the sulfonated polymer at the interface of the aqueous phase and the hydrocarbon oil phase. When calcium chloride water is present, the rheological properties of the muds containing either polymer is found to have deteriorated.

EXAMPLE III

An oil-based drilling mud was produces (as described in Example I) with a 2.65 mole percent sodium sulfonated polystyrene and a nonionic surfactant (Pluronic ® F-68 is manufactured by the BASF Wyandotte Corporation). The rheological properties of this mud in both fresh and calcium chloride water is presented in Table III.

TABLE III

Rheological Properties of an Oil-Based Mud Containing 2.65 Mole Percent and a Nonionic Surfactant

| Designation | lbs/bbl | $H_2O$ | $600^{(A)}$ | $300^{(A)}$ | $PV^{(A)}$ | $YP^{(A)}$ | $Gels^{(A)}$ | Temp. °F. |
|---|---|---|---|---|---|---|---|---|
| 1 | 0.5-SPS | Fresh | 65 | 42 | 23 | 19 | 7–16 | 150 |
|   | 0.5-F68 |       | 49 | 27 | 22 | 5  | 1–10 | 300 |
|   |         |       | 52 | 30 | 22 | 8  | 4–20 | 400 |
| 3 | 0.5-SPS | Fresh | 47 | 27 | 20 | 7  | 3–7  | 150 |
|   | 1.0-F88 |       | 47 | 26 | 21 | 5  | 2–10 | 300 |
|   |         |       | 61 | 35 | 26 | 9  | 5–16 | 400 |
| 2 | 0.5-SPS | Salt  | 47 | 28 | 19 | 9  | 3–7  | 150 |
|   | 0.5-F68 |       | 54 | 29 | 25 | 4  | 1–5  | 300 |
|   |         |       | 59 | 33 | 26 | 7  | 3–10 | 400 |
| 4 | 0.5-SPS | Salt  | 42 | 26 | 16 | 10 | 3–6  | 150 |
|   | 1.0-F68 |       | 48 | 27 | 21 | 6  | 1–5  | 300 |
|   |         |       | 55 | 30 | 25 | 5  | 3–13 | 400 |

$^{(A)}$The explanation of these symbols is given in Table I.

The data in Table III shows that the 2.65 mole percent sulfonated polystyrene along with the nonionic surfactant produced an oil-drilling mud possessing excellent rheological properties. Both the viscosity and gel strength characteristics of the oil mud is enhanced in either fresh or calcium chloride water. In addition, the sulfonated polystyrene and nonionic surfactant is capable of maintaining these characteristics after being subjected to high temperatures (300° F.–400° F.).

What is claimed is:

1. An oil-based drilling mud which comprises:
   (a) a hydrocarbon oil;
   (b) about 1 to about 10 parts by weight of water per 100 parts by weight of the hydrocarbon oil;
   (c) about 20 to about 50 lb/bbl of at least one emulsifier;
   (d) weighting material necessary to achieve the desired density; and
   (e) about 0.25 to about 4.0 lb/bbl of a water insoluble and oil insoluble neutralized sulfonated thermoplastic polymer having a molecular weight as measured by GPC of about 5,000 to about 500,000, said water insoluble and oil insoluble neutralized sulfonated thermoplastic polymer having about 5 to about 100 meq. of sulfonate groups per 100 grams of the neutralized sulfonated thermoplastic polymer wherein said water insoluble and oil insoluble sulfonated thermoplastic is derived from a polymer selected from the group consisting of polystyrene, poly-t-butyl-styrene, polychlorostyrene, poly-alpha methyl styrene, polyvinyl toluene and co- or terpolymers of styrene and acrylonitrile, methyl methacrylate and butadiene.

2. A drilling mud according to claim 1, wherein the sulfonate groups of said water insoluble and oil insoluble neutralized sulfonated thermoplastic polymer are neutralized with a counterion selected from the group consisting of antimony, iron, aluminum, lead and groups IA, IIA, IB and IIB of the Periodic Table of Elements.

3. A drilling mud according to claim 1, wherein the sulfonate groups of said water insoluble and oil insoluble neutralized sulfonated thermoplastic polymer are neutralized with a counterion selected from the group consisting of zinc, magnesium and sodium.

4. A drilling mud according to claim 1, wherein the sulfonate groups of said water insoluble and oil insoluble neutralized sulfonated thermoplastic polymer are neutralized with zinc counterion.

5. A drilling mud according to claim 1, wherein said water insoluble and oil insoluble neutralized sulfonated thermoplastic polymer is derived from polystyrene.

6. A drilling mud according to claim 1 wherein said wetting agent is an alkylaryl sulfonate.

7. A drilling mud according to claim 1 wherein said weighting material is Barite or barium sulfate.

8. A drilling mud according to claim 1 wherein the concentration level of said weighting material is sufficient to give said drilling mud a specific gravity of about 7 pounds per gallon to about 20 pounds per gallon.

9. A drilling mud according to claim 1 wherein said hydrocarbon oil is a No. 2 diesel oil.

10. A drilling mud according to claim 1 wherein said emulsifier is a magnesium or calcium soap of a fatty acid.

11. A drilling mud according to claim 1 which further includes a polar cosolvent at concentration levels less than 1 wt.% of said drilling mud.

12. A drilling mud according to claim 1 wherein said water is salt water.

13. A drilling mud according to claim 1 wherein the concentration of said water is about 3 to about 5 parts by weight per 100 parts by weight of said hydrocarbon oil.

* * * * *